United States Patent
Dawson et al.

(10) Patent No.: US 10,295,559 B2
(45) Date of Patent: May 21, 2019

(54) ACCELEROMETER CALIBRATION IN A ROTATING MEMBER

(71) Applicant: Freescale Semiconductor, Inc., Austin, TX (US)

(72) Inventors: Chad S. Dawson, Queen Creek, AZ (US); John Wertz, Phoenix, AZ (US)

(73) Assignee: NXP USA, Inc., Austin, TX (US)

( * ) Notice: Subject to any disclaimer, the term of this patent is extended or adjusted under 35 U.S.C. 154(b) by 408 days.

(21) Appl. No.: 14/501,276

(22) Filed: Sep. 30, 2014

(65) Prior Publication Data

US 2016/0091529 A1  Mar. 31, 2016

(51) Int. Cl.
*G01P 21/00* (2006.01)
*G01P 15/00* (2006.01)

(52) U.S. Cl.
CPC .............. *G01P 21/00* (2013.01); *G01P 15/00* (2013.01)

(58) Field of Classification Search
None
See application file for complete search history.

(56) References Cited

U.S. PATENT DOCUMENTS

| 5,083,596 A | * | 1/1992 | Kato ............. B60O 5/004 152/153 |
| 2009/0056411 A1 | | 3/2009 | Goujon et al. |
| 2011/0307205 A1 | * | 12/2011 | Vassilieff ............ G01P 3/22 702/96 |
| 2012/0203486 A1 | | 8/2012 | Almalki et al. |
| 2012/0215477 A1 | | 8/2012 | Tuck et al. |
| 2013/0197845 A1 | | 8/2013 | Keal et al. |
| 2015/0289820 A1 | * | 10/2015 | Miller ............. A61B 5/7221 600/300 |

* cited by examiner

*Primary Examiner* — Matthew G Marini
*Assistant Examiner* — Ruben C Parco, Jr.
(74) *Attorney, Agent, or Firm* — Charlene R. Jacobsen

(57) ABSTRACT

To calibrate an accelerometer, a rotating member is rotated over multiple periods, thereby causing the accelerometer attached to the rotating member to repeatedly turn over. A processor obtains acceleration measurements as the accelerometer turns and determines a set of local minima and maxima of the acceleration measurements. Based on these local minima and maxima, the processor determines a sensitivity of the accelerometer. The processor stores the sensitivity for use in adjusting subsequent accelerometer measurements, thus calibrating the accelerometer.

10 Claims, 4 Drawing Sheets

ACCELEROMETER CALIBRATION IN A ROTATING MEMBER

BACKGROUND

Field of the Disclosure

The present disclosure relates generally to accelerometers and more particularly to calibration of accelerometers.

Description of the Related Art

Accelerometers are used in a wide variety of devices and applications. For example, an accelerometer can be placed in a tire to indicate to a processor when the tire is moving and to assist the processor in wheel localization. In order to properly measure acceleration, an accelerometer is calibrated to adjust for both an offset and a sensitivity of the accelerometer. Typically, the accelerometer is calibrated during or immediately after manufacture by performing a flip test, wherein the accelerometer is turned over, or flipped. Measurements are taken from the accelerometer in both the un-flipped and flipped positions and the accelerometer is calibrated based on the measurements. However, the flip test requires specialized testing equipment, such as flip handlers to turn over the accelerometer. Accordingly, the flip test can be undesirably expensive and time consuming.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for calibrating an accelerometer attached to a rotating member. These techniques allow the accelerometer to be calibrated in the same environment and configuration as its intended use, thereby reducing calibration costs. To calibrate the accelerometer, in at least one embodiment the rotating member is rotated over multiple periods (that is, through multiple complete rotations), thereby causing the accelerometer to repeatedly turn over. A processor obtains acceleration measurements as the accelerometer turns and determines a set of local minima and maxima of the acceleration measurements. Based on these local minima and maxima, the processor determines a sensitivity of the accelerometer. The processor stores the sensitivity for use in adjusting subsequent accelerometer measurements, thus calibrating the accelerometer.

In at least one embodiment, the rotating member is a tire mounted on an automobile or other vehicle. The accelerometer is attached to a sidewall or other portion of the wheel. In response to the vehicle being started or other calibration signal, a processor of the vehicle initiates a calibration phase for the accelerometer. As the vehicle is driven, the tire rotates, causing the accelerometer to turn over, allowing the processor to determine a sensitivity of the accelerometer as described further herein. After calibration, the processor employs calibrated acceleration measurements from the accelerometer to perform wheel localization and other functions during normal operation of the vehicle. Thus, the accelerometer is configured in the same environment and configuration as its intended use, obviating the need for specialized and expensive test equipment to determine the sensitivity of the accelerometer. Further, because the accelerometer is being configured in the same environment as its intended use, it will provide more accurate measurements in the event that changes in the environment or in the accelerometer itself (e.g., due to aging) cause changes in the behavior of the accelerometer.

Figure 1:
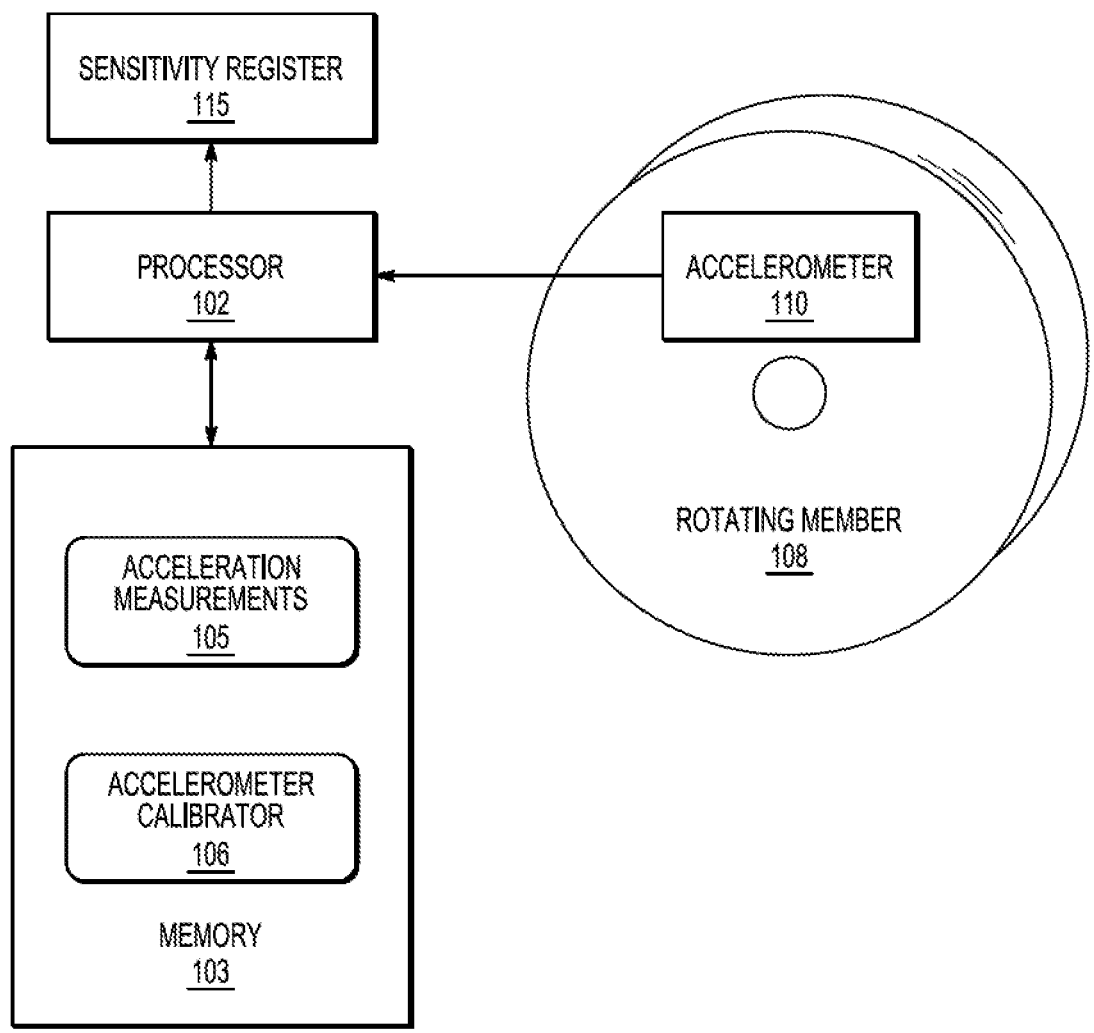
FIG. 1 is a block diagram of an accelerometer calibration system that calibrates an accelerometer attached to a rotating member in accordance with at least one embodiment.

FIG. 1 illustrates an accelerometer calibration system 100 for calibrating an accelerometer 110 in accordance with at least one embodiment. The calibration system 100 includes a processor 102, a memory 103, a rotating member 108, and a sensitivity register 115. Although in the illustrated example of FIG. 1 the processor is depicted as separate from the accelerometer 110, in at least one embodiment the processor 102 is a master control unit located in a common integrated circuit package with the accelerometer 110, the memory 103, and the sensitivity register 115. The processor 102 can be a general purpose processor, application-specific processor, or programmable logic generally configured to execute instructions arranged in the form of computer programs. The memory 103 is computer memory such as random access memory (RAM), non-volatile memory such as flash memory, or a combination thereof. The memory 103 stores computer programs to be executed at the processor 102, as well as data manipulated by those programs. In the illustrated example of FIG. 1, the memory 103 stores an accelerometer calibrator 106, which is a computer program (or subroutine or other module thereof) having instructions that, when executed at the processor, manipulate the processor to measure a sensitivity of the accelerometer 110. The memory 103 also stores acceleration measurements 105, which are acceleration measurements generated by the accelerometer 110 during calibration, as described further herein.

The rotating member 108 is a structure that rotates about an axis. As used herein, the term "rotate" is defined to mean a movement of at least 360 degrees around an axis or other central point. The accelerometer 110 is attached to the rotating member 108, so that when the rotating member 108 rotates, the accelerometer 110 also rotates. In at least one embodiment, the rotating member is a wheel of a vehicle that rotates around an axle of the vehicle, and the accelerometer 110 may be affixed to a tire or rim of the wheel of the vehicle.

The accelerometer 110 is a device that includes a mechanical portion, such as a proof mass, that moves as the accelerometer 110 is moved. The accelerometer 110 further includes a transducer portion that converts the acceleration of the mechanical portion, as it moves, to one or more electrical signals. In at least one embodiment, the voltage, current, frequency, or other aspect of the one or more electrical signals is indicated by a number, referred to as a count, that is proportional to the acceleration of the mechanical portion. In order to accurately relate the counts of the accelerometer to the actual acceleration (as expressed in g or other unit) experienced by the mechanical portion, the accelerometer 110 is calibrated. In particular, at least two aspects of the accelerometer 110 are identified: its sensitivity and its offset. The offset of the accelerometer 110 refers to the number of counts output by the accelerometer when it is at rest (i.e., experiencing 0 g of acceleration). The sensitivity of the accelerometer 110 refers to the number of counts output by the accelerometer 110 per unit of acceleration (e.g., the number of counts per g). In at least one embodiment, the offset of the accelerometer 110 is identified during manufacture, prior to being attached to the rotating member 108. In another embodiment, the offset of the accelerometer 110 is identified after being attached to the rotating member 108 and before, after, or concurrent with identification of the sensitivity of the accelerometer 110. The offset can be stored in a designated register (not shown) for use in determining the acceleration indicated by subsequent acceleration measurements at the accelerometer 110.

In operation, the processor 102 receives or self-generates a signal indicating the accelerometer 110 is to be calibrated. In at least one embodiment, the signal corresponds to a reset signal for the processor 102. In another embodiment, the signal is a dedicated calibration signal indicating the accelerometer 110 is to be calibrated. In response to the signal, the processor 102 executes the accelerometer calibrator 106 to calibrate the accelerometer 110. During calibration, the processor 102 records the acceleration measurements 105 as the rotating member 108 rotates through multiple rotation periods. In at least one embodiment, rotation of the rotating member 108 is not directly initiated or controlled by the processor 102, but instead is a byproduct of normal movement of a device incorporating the rotating member 108. For example, the rotating member 108 can be a wheel of an automobile, and the rotations of the rotating member 108 are a result of the automobile being driven. In another embodiment, the processor 102 may initiate and control rotation of the rotating member 108.

Either concurrently with recording the acceleration measurements 105 or after the measurements have been recorded, the processor 102 uses the acceleration measurements 105 to determine a sensitivity of the accelerometer 110. In particular, as the rotating member 108 rotates, the accelerometer 110 is flipped between at least two positions. The acceleration measurements between these two positions can be employed to determine the sensitivity of the accelerometer 110. However, because of the rotation of the rotating member 108, the accelerometer 110 also experiences centrifugal force that perturbs the acceleration measurements. Accordingly, the processor 102 adjusts the acceleration measurements 105 to account for this centrifugal force, and determines the sensitivity based on the adjusted measurements. For example, as described further herein, in at least one embodiment the processor 102 can determine the sensitivity based on relative differences between different acceleration measurements while the accelerometer 110 rotates. This effectively cancels out the effect of centrifugal force on the individual measurements, even if the processor 102 does not or cannot directly measure the magnitude of the centrifugal force.

To determine the sensitivity of the accelerometer 110, the processor 102 determines a series of local maximum values and minimum values of the acceleration measurements 105 and calculates a set of initial sensitivity values as follows. Assume that Max(N) is a given local maximum corresponding to a range of samples N, Min(N) is the corresponding local minimum, and Max(N+1) is the next local maximum following Max(N). The corresponding initial sensitivity value, designated S(N), is calculated by the processor 102 according to the following equation:

$$S(N) = \frac{(\text{Max}(N) - \text{Min}(N)) + (\text{Max}(N+1) - \text{Min}(N))}{2}$$

Because of the centrifugal force experienced by the accelerometer 110, the magnitudes of the local maximum and minimum values will vary over time, typically tending to rise as the centrifugal force increases. However, because the initial sensitivity values are calculated based on differences in the local maximums and minimums, the contribution of the centrifugal force is effectively removed from the calculation. That is, the centrifugal force applied to the accelerometer 110 is expected to be the same, or nearly the same, for the acceleration measurements corresponding to the local minimum and associates local maximum. Accordingly, when the differences are calculated based on the local minimum and local maximum, the effect of the centrifugal force on the individual measurements does not impact this difference. The processor 102 thus accounts for the effect of centrifugal forces on the acceleration measurements 105.

To account for potential errors in individual ones of the initial sensitivity values, the processor 102 averages the initial sensitivity values to determine a final sensitivity value, and stores this final sensitivity value at the sensitivity register 115. The final sensitivity value can be used to determine the acceleration indicated by subsequent acceleration measurements of the accelerometer 110 during normal operation. To illustrate, the relationship between acceleration experienced by accelerometer 110 and the corresponding number of counts it provides can be expressed according to the following equation:

Acceleration=Counts*Sensitivity+Offset

Thus, after calibration, to determine the acceleration experienced by the accelerometer 110, the processor 102 determines the number of counts received from the accelerometer 110. The processor 102 then multiplies the received counts by the sensitivity value at the sensitivity register 115 and adds the offset stored at the offset register (not shown).

In at least one embodiment, the acceleration measurements 105 may include a significant amount of noise due to the environment of the rotating member 108. To prevent the noise from causing undue errors in the calibration of the accelerometer 110, the processor 102 can pass the acceleration measurements 105 through a moving average filter. The initial sensitivities are determined based on the filtered acceleration measurements. However, in some scenarios the filtering can result in an underestimation of the sensitivity of the accelerometer 110. Accordingly, the processor 102 can apply a correction to the initial or final sensitivity to account for the underestimation. The exact character of the underestimation can be determined empirically for the system that includes the accelerometer 110, and the adjustment made based on the empirically determined character.

Figure 2:
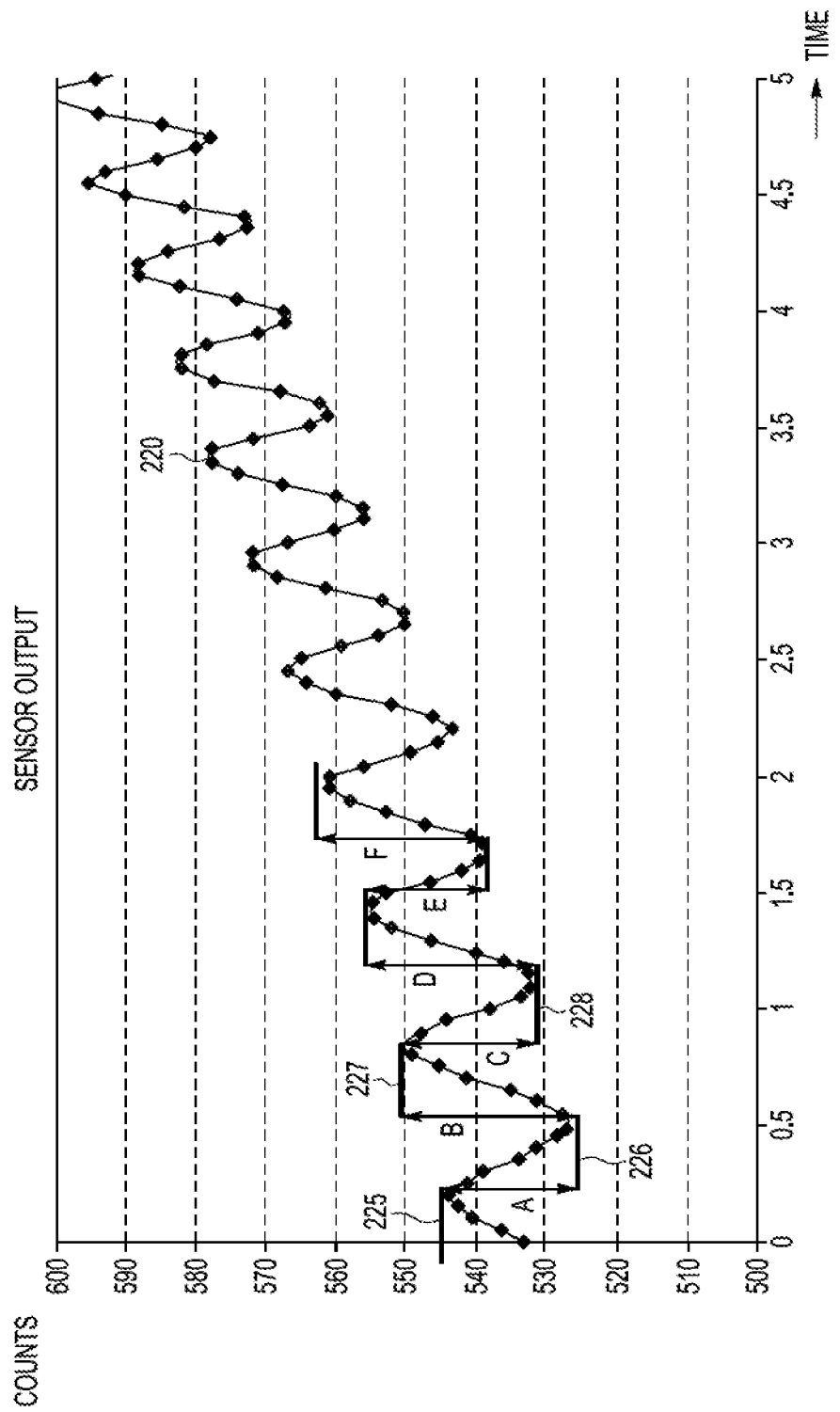
FIG. 2 is a diagram illustrating acceleration measurements for calibrating the accelerometer of FIG. 1 in accordance with at least one embodiment.

FIG. 2 illustrates a plot 200 of example acceleration measurements 105 in accordance with at least one embodiment of the present disclosure. The x-axis (abscissa) of the plot 200 represents time and the y-axis (ordinate) represents counts generated by the accelerometer 110 during calibration. A curve 220 indicates the acceleration measurements 105 over time. In the illustrated example, the average magnitude of the curve 220 generally rises over time, due to the centrifugal forces experienced by the accelerometer 110 as the rotating member 108 rotates and increases in speed.

The curve 210 defines a series of local maximums and minimums, such as local maximums 225 and 227 and local minimums 226 and 228. The difference between a local maximum and a corresponding local minimum is referred to for purposes of description as the "swing" between the local maximum and local minimum. In the illustrated example of FIG. 2, the local maximum 225 and local minimum 226 define a swing designated "A" and the local minimum 226 and local maximum 228 define a swing designated "B". FIG. 2 further illustrates swings C, D, E, and F, defined by subsequent local maximums and minimums. The character of the accelerometer 110 is such the average between two successive swings indicates its sensitivity. Accordingly, during calibration the processor 102 determines an initial sensitivity value for swings A and B, by adding the swings together and divides by two. Similarly, the processor 102 determines initial sensitivity values based on swings B and C, C and D, D and E, and E and F. The processor 102 then averages the initial sensitivity values together to determine a final sensitivity value. Because the initial sensitivity values are based on swings, rather than absolute magnitudes of the acceleration measurements 105, the influence of the centrifugal force on the measurements is removed, allowing for proper calibration.

Figure 3:
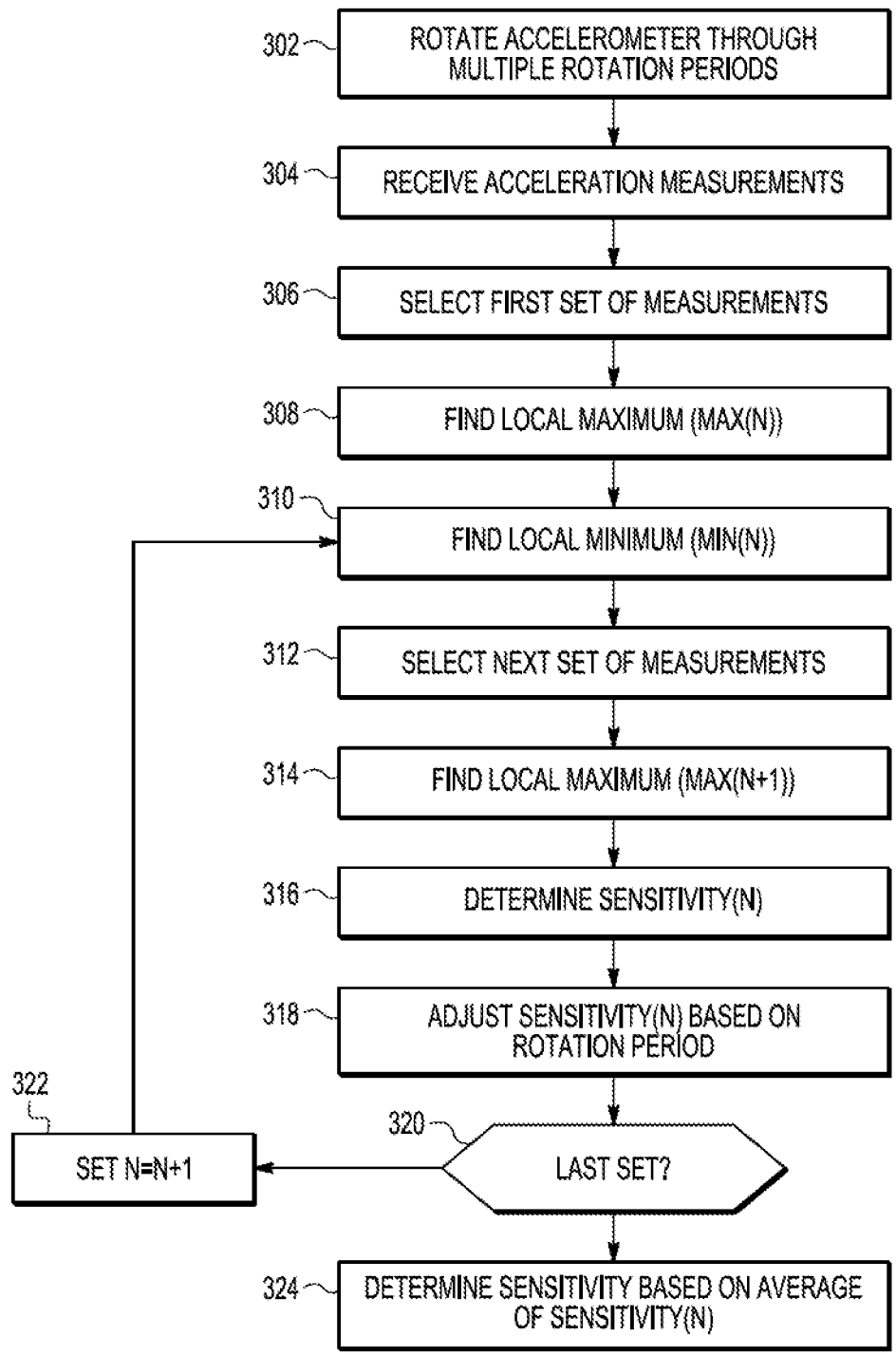
FIG. 3 is a flow diagram of a method of calibrating an accelerometer attached to a rotating member in accordance with at least one embodiment.

FIG. 3 illustrates a method 300 of calibrating the accelerometer 110 at the accelerometer calibration system 100 in accordance with at least one embodiment. At block 302 the rotating member 108 is rotated through multiple rotation periods, thereby also rotating the accelerometer 110 through several rotation periods. At block 304 the processor 102 receives acceleration measurements 105 from the accelerometer 110 as it rotates, and stores the acceleration measurements 105 at the memory 103.

At block 306 the processor 102 selects an initial current set of measurements of the acceleration measurements 105. In at least one embodiment, the processor 102 selects the set of measurements corresponding to an amount of time expected or measured to correspond to at a rotation of the accelerometer 110. At block 308 the processor 102 identifies the local maximum, designated Max(N), in the set of measurements. At block 310 the 308 the processor 102 identifies the first local minimum, designated Min(N), in the set of measurements. At block 312 the processor 102 selects a next set of measurements of the acceleration measurements 105, the next set corresponding to the succeeding rotation of the accelerometer 110. At block 314 the processor 102 identifies the local maximum, designated Max(N+1), in the next set of measurements. At block 316 the processor 102 identifies an initial sensitivity value, designated S(N), for the current set of measurements.

At block 318 the processor 102 determines a rotation period, designated PER(N), for the accelerometer 110 based on the time elapsed between Max(N) and Max (N+1). The processor 102 further determines correction coefficients to adjust for any filtering of the acceleration measurements 105 that can cause the measurements to incorrectly reflect the sensitivity of the accelerometer 110. In at least one embodiment, these coefficients are empirically determined based on tests of the calibration system 100 or an analogous system. The processor 102 then adjusts the initial sensitivity value S(N) based on the coefficients and the rotation period. In at least one embodiment, the coefficients are designated C0, C1, and C2, and the initial sensitivity value is adjusted according to the following formula:

$$S(N)=S(N)*(C0+C1*PER(N)+C2*PER(N)^2)$$

At block 320, the processor 102 determines whether the current set of acceleration measurements is the last set to be analyzed. In at least one embodiment, the processor 102 calibrates the accelerometer 110 based on a fixed number of acceleration measurements or a fixed amount of time, and determines the last set to be analyzed based on one or more of these fixed amounts. If the current set is not the last set to be analyzed, the method flow moves to block 322 and the processor 102 sets the next set of measurements to be the current set of measurements (so that Max(N+1) becomes Max (N)). The method flow returns to block 310 and the processor 102 proceeds to determine the next initial sensitivity value.

Returning to block 320, if the processor 102 determines that all sets of the acceleration measurements 105 to be analyzed have been analyzed, the method flow moves to block 324 and the processor 102 averages together all of the initial sensitivity values to determine a final sensitivity value. The processor 102 stores the final sensitivity value at the sensitivity register 115. The value at the sensitivity register 115 can be used to convert subsequent acceleration measurements provided by the accelerometer 110 to acceleration values according to conventional conversion techniques.

In some scenarios, the calibration of the accelerometer 110 may take place under conditions that are unfavorable for calibration. For example, if the accelerometer is placed in a tire, and the tire undergoes rapid or extreme changes in its frequency of rotation, the acceleration measurements 105 may exhibit irregular behavior. In such scenarios, the sensitivity determined by the processor 102 as set forth in FIG. 3 may not accurately reflect the sensitivity of the accelerometer 110. Accordingly, in at least one embodiment, prior to or after determining the final sensitivity value, the processor 102 can analyze the acceleration measurements 105 to determine whether the character of the measurements is such that the final sensitivity value is reliable. If the analysis indicates the final sensitivity value is not reliable, the processor 102 can take remedial action, such as recalibrating the accelerometer 110 with a new set of acceleration measurements, signaling an error, and the like, or a combination thereof.

Figure 4:
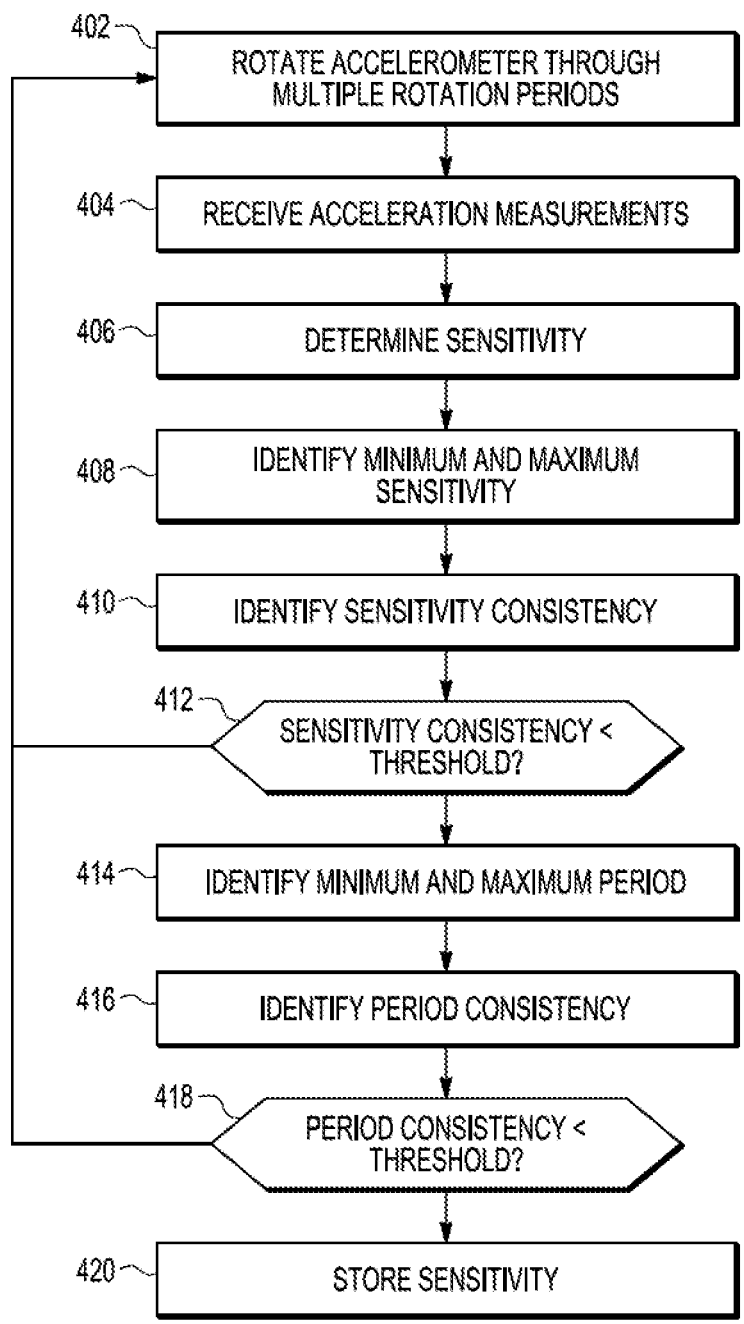
FIG. 4 is a flow diagram of a method of identifying accurate calibration of an accelerometer attached to a rotating member in accordance with at least one embodiment.

FIG. 4 illustrates a flow diagram of a method 400 of the processor 102 determining whether a final sensitivity value is reliable in accordance with at least one embodiment of the present disclosure. At block 402 the rotating member 108 is rotated through multiple rotation periods, thereby also rotating the accelerometer 110 through several rotation periods. At block 404 the processor 102 receives acceleration measurements 105 from the accelerometer 110 as it rotates, and stores the acceleration measurements 105 at the memory 103. At block 406 the processor 102 determines a final sensitivity value based on a set of initial sensitivity values, as described above with respect to FIG. 3. At block 408 the processor 102 determines the minimum and maximum sensitivity values of the initial sensitivity values. At block 410 the processor 102 determines the sensitivity consistency of the initial sensitivity values by dividing the minimum sensitivity value by the maximum sensitivity value. At block 412, the processor 102 determines if the sensitivity consistency is lower than a specified threshold value. If so, this indicates that the final sensitivity value is unreliable, and the method flow returns to block 402 so that the processor 102 can recalibrate the accelerometer 110 with a new set of acceleration measurements.

Returning to block 412, if the processor 102 determines that the sensitivity consistency matches or exceeds the corresponding threshold value, the method flow moves to block 414 and the processor 102 identifies the minimum and maximum periods of the acceleration measurements 105. A period of the acceleration measurements 105 refers to the time between the local maximums (Max(N) and Max (N+1)) used to determine an initial sensitivity value. At block 416 the processor 102 determines the period consistency by dividing the minimum period by the maximum period. At block 418, the processor 102 determines if the period consistency is lower than a specified threshold value. If so, this indicates that the final sensitivity value is unreliable, and the method flow returns to block 402 so that the processor 102 can recalibrate the accelerometer 110 with a new set of acceleration measurements. If the period consistency matches or exceeds the threshold value, the method flow proceeds to block 420 and the processor 102 stores the final sensitivity value at the sensitivity register 115.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   flipping an accelerometer attached to a rotating member from a first position to a second position as the rotating member rotates through multiple rotation periods;
   receiving a first set of measurements from the accelerometer attached to the rotating member as the rotating member rotates through multiple rotation periods at the first position and the second position;
   calibrating the accelerometer based on the first set of measurements corresponding to the first position and the second position of the accelerometer, wherein calibrating the accelerometer comprises:
      determining a first difference between a first local maximum and a first local minimum of the first set of measurements;
      determining a second difference between a second local maximum and the first local minimum of the first set of measurements;
      determining a sensitivity value of the accelerometer based on an average of the first difference and the second difference; and
      adjusting a second set of measurements based on the sensitivity value; and
   localizing the rotating member based on the adjusted second set of measurements.

2. The method of claim 1, wherein calibrating the accelerometer comprises:
   accounting for a centrifugal force applied to the accelerometer based in part on the second local maximum.

3. The method of claim 2, further comprising:
   identifying the second local maximum as the local maximum of a rotation period immediately following a rotation period of the first local maximum.

4. The method of claim 3 further comprising:
   determining a set of initial sensitivity values calculated based on a plurality of local maximums and local minimums including the first local minimum, the first local maximum, and the second local maximum; and wherein
   calibrating the accelerometer comprises calibrating the accelerometer based on an average of the set of initial sensitivity values.

5. The method of claim 4, wherein calibrating the accelerometer comprises:
   determining an adjustment based on a rotation period of the rotating member;

adjusting the average of the set of initial sensitivity values based on the adjustment; and calibrating the accelerometer based on the adjusted average.

6. The method of claim 1, further comprising:

determining a consistency of the first set of measurements; and repeating calibration of the accelerometer in response to the consistency being lower than a threshold.

7. The method of claim 1, wherein the rotating member comprises a tire.

8. A method, comprising:

rotating a member through a plurality of rotation periods, the member being attached to an accelerometer;

flipping the accelerometer from at least a first position to a second position while rotating;

determining, at the first position and the second position of the accelerometer, a first plurality of acceleration measurements over the plurality of rotation periods;

calibrating the accelerometer based on the first plurality of acceleration measurements, wherein calibrating the accelerometer comprises:

determining a first difference between a first local maximum and a first local minimum of the acceleration measurements;

determining a second difference between a second local maximum and the first local minimum of the acceleration measurements; and adapting a second plurality of acceleration measurements based on an average of the first difference and the second difference; and localizing the member based on the calibrated accelerometer.

9. The method of claim 8, wherein calibrating the accelerometer further comprises:

calibrating the accelerometer based on a centrifugal force accounted for by the first plurality of acceleration measurements.

10. The method of claim 8, wherein:

the member comprises a vehicle tire; and rotating the member comprises turning the vehicle tire by driving a vehicle including the vehicle tire.

* * * * *